United States Patent
Hong

(10) Patent No.: US 10,604,415 B2
(45) Date of Patent: Mar. 31, 2020

(54) BASIC OXYGEN FURNACE SLAG TREATMENT METHOD

(71) Applicant: Kun-Liang Hong, Tainan (TW)

(72) Inventor: Kun-Liang Hong, Tainan (TW)

( * ) Notice: Subject to any disclaimer, the term of this patent is extended or adjusted under 35 U.S.C. 154(b) by 272 days.

(21) Appl. No.: 15/454,208

(22) Filed: Mar. 9, 2017

(65) Prior Publication Data

US 2018/0009709 A1    Jan. 11, 2018

(30) Foreign Application Priority Data

Jul. 6, 2016    (CN) .......................... 2016 1 0527392

(51) Int. Cl.
| | | |
|---|---|---|
| *C01F 5/24* | (2006.01) | |
| *C04B 5/06* | (2006.01) | |
| *C25B 1/26* | (2006.01) | |
| *C25B 9/18* | (2006.01) | |
| *C01F 11/18* | (2006.01) | |

(52) U.S. Cl.
CPC ................ *C01F 5/24* (2013.01); *C01F 11/18* (2013.01); *C04B 5/06* (2013.01); *C25B 1/26* (2013.01); *C25B 9/18* (2013.01)

(58) Field of Classification Search
None
See application file for complete search history.

(56) References Cited

U.S. PATENT DOCUMENTS

| | | | |
|---|---|---|---|
| 2009/0038955 A1* | 2/2009 | Rau ........................... | C25B 1/00 205/508 |
| 2010/0084283 A1* | 4/2010 | Gomez ................ | B01D 53/864 205/742 |

FOREIGN PATENT DOCUMENTS

| | | | | |
|---|---|---|---|---|
| CN | 202265444 U | * | 6/2012 | |
| JP | 2011093761 A | * | 5/2011 | ............... C04B 5/00 |

OTHER PUBLICATIONS

Translation of JP 2011-093761 A (Year: 2011).*

* cited by examiner

*Primary Examiner* — Melissa S Swain
(74) *Attorney, Agent, or Firm* — Rosenberg, Klein & Lee

(57) ABSTRACT

A basic oxygen furnace slag treatment method includes the steps of mixing basic oxygen furnace slag with an active aqueous solution and then keeping the mixture thus obtained under an enclosed environment for reaction and then employing a solid-liquid separation procedure to separate solid phase from liquid phase. Since basic oxygen furnace slag has strong alkaline, the method of the invention overcomes the problem that directly discharging basic oxygen furnace slag will cause environmental pollutions. The basic oxygen furnace slag treatment method avoids a secondary pollution, and can turn waste into treasure, bringing a number of economic benefits.

1 Claim, 17 Drawing Sheets

BASIC OXYGEN FURNACE SLAG TREATMENT METHOD

BACKGROUND OF THE INVENTION

1. Field of the Invention

The present invention relates to slag treatment technology and more particularly, to a basic oxygen furnace slag (BOF slag) treatment method.

2. Description of the Related Art

The furnace slag produced after a long period of incineration of a steel-making furnace, blast furnace or incinerator has several possible pollutants: A. The added lime, fluorite, quartz stone in the incineration process can cause the produced slag to contain a high ratio of strong alkaline substances such as calcium oxide, magnesium oxide, potassium oxide, etc. B. Incineration process produces heavy metal contamination. C. Slag contains dioxin on the surface.

Since basic oxygen furnace slag contains a high ratio of strong alkaline substances of high pH value, if basic oxygen furnace slag is directly discharged without treatment, it will directly cause environmental pollution. This problem must be resolved.

SUMMARY OF THE INVENTION

The present invention has been accomplished under the circumstances in view. It is the main object of the present invention to provide a basic oxygen furnace slag treatment method, which avoids secondary pollution, and can turn waste into treasure, bringing a number of economic benefits.

It is another object of the present invention to provide a basic oxygen furnace slag treatment method, which utilizes commercially available reagents and starting materials, facilitating the implementation of the method.

It is still another object of the present invention to provide a basic oxygen furnace slag treatment method, which avoids secondary pollution, achieves remarkable treatment effects, and is rapid and inexpensive to implement, and the cost of treating one ton of basic oxygen furnace slag is about 7 to 15 U.S. Dollars.

To achieve these and other objects of the present invention, a basic oxygen furnace slag treatment method comprises the steps of: mixing basic oxygen furnace slag with one of active aqueous solution A and active aqueous solution B uniformly to form a mixture, and then keeping the mixture thus obtained under an enclosed environment for reaction for 0.2-5 hours, and then employing a solid-liquid separation procedure to said mixture to separate solid phase from liquid phase. Further, the active aqueous solution A has a pH value of 1-2, and is obtained by treating carbonic acid aqueous solution aqueous solution through an electrocatalytic water equipment. The active aqueous solution B has a pH value of 5-7, and is obtained by treating carbonic acid aqueous solution through the electrocatalytic water equipment. The mass ratio between the basic oxygen furnace slag and the active aqueous solution A/said active aqueous solution B is 1:(0.5-10).

The composition analysis, apparent specific gravity and pH value of basic oxygen furnace slag are shown in the following Table I:

TABLE I

Basic oxygen furnace slag composition table

| Item | | Results |
|---|---|---|
| Composition analysis (wt %) | $SiO_2$ | 11.45 |
| | $Al_2O_3$ | 4.48 |
| | $Fe_2O_3$ | 21.60 |
| | CaO | 39.37 |
| | MgO | 6.39 |
| | $TiO_2$ | 0.49 |
| | $P_2O_5$ | 1.97 |
| | MnO | 4.01 |
| | LOI (Oxygen index) | 3.94 |
| | Total | 93.70 |
| Apparent specific gravity | | 3.2 |
| pH | | 12 |

In the present invention, the mass ratio between basic oxygen furnace slag and active aqueous solution A or active aqueous solution B is 1:2-5.

The active aqueous solution A is further explained hereinafter:

The pH value of active aqueous solution A is preferably 1.5. The carbonic acid aqueous solution aqueous solution is prepared by diluting carbonic acid aqueous solution. The concentration of the carbonic acid aqueous solution aqueous solution is preferably 0.1%-5%, or most preferable 0.3%, and the percentage is mass percentage. The pH value of the carbonic acid aqueous solution aqueous solution is preferably 4-7. The circulation time of the carbonic acid aqueous solution aqueous solution in the electrocatalytic water equipment is preferably 3-30 minutes, or most preferably 20 minutes.

In the preparation of active aqueous solution A, an electrochemical reaction is created in the electrocatalytic water equipment as follow:

$$2HCl + H_2O \rightarrow 4H^+ + Cl^- + ClO^- + 2e$$

The principle lies in: Low concentration of carbonic acid aqueous solution aqueous solution causes the above-described electrochemical reaction in the electrocatalytic water equipment, generating a large amount of $H^+$, thereby significantly lowering the pH value of the solution.

When using active aqueous solution A to treat basic oxygen furnace slag, reactions created between basic oxygen furnace slag and active aqueous solution A include CaO reaction to form $CaCl_2$ and $Ca(ClO)_2$, MgO reaction to form $MgCl_2$ and $Mg(ClO)_2$, $K_2O$ reaction to form KCl and KClO. Specific reaction equations are exemplified below:

$$CaO + H_2O = Ca(OH)_2;$$

$$Ca(OH)_2 + 2HCl = CaCl_2 + H_2O;$$

$$Ca(OH)_2 + 2HClO = Ca(ClO)_2 + 2H_2O;$$

$$Ca(ClO)_2 + 2HCl = CaCl_2 + 2HClO;$$

$$Ca^{2+} + 2ClO^- + H_2O + CO_2 = CaCO_3\downarrow + 2HCO \text{ or } ClO^- + H^+ = HClO;$$

$$CaO + 2HCl = CaCl_2 + H_2O.$$

The active aqueous solution B is further explained hereinafter:

The carbonic acid aqueous solution is prepared by diluting carbon dioxide with water. The concentration of the carbonic acid aqueous solution is preferably 3%-30%, and the percentage is mass percentage. The pH value of the carbonic acid aqueous solution is preferable 5-7. The circulation time of the carbonic acid aqueous solution in the electrocatalytic water equipment is preferably 3-30 minutes, or most preferably 20 minutes.

In the preparation of active aqueous solution B, the following electrochemical reaction is created in the electrocatalytic water equipment:

$$H_2CO_3 \rightarrow H_2O + CO_2 \uparrow$$

When using active aqueous solution B to treat basic oxygen furnace slag, reactions are created between basic oxygen furnace slag and the active aqueous solution B as follows:

$$CaO + H_2O = Ca(OH)_2;$$

$$Ca(OH)_2 + CO_2 = CaCO_3 \downarrow + H_2O;$$

$$MgO + H_2O = Mg(OH)_2;$$

$$Mg(OH)_2 + 2CO_2 = Mg(HCO_3)_2.$$

$Mg(HCO_3)_2$ produced after the reactions is processed through positive-liquid separation procedure, and then exposed to remove water, and thus the following reaction is generated:

$$Mg(HCO_3)_2 = MgCO_3 + H_2O + 2CO_2 \uparrow$$

In the preferred embodiment of the present invention, sealing can be achieved using a cover-attached container, reducing the chance that $H^+$, $OH^-$, $Cl^-$, $ClO^-$ will volatilize into the air without having been involved in the acid and alkali neutralization reaction.

The pH value of the solid phase obtained in the solid-liquid separation procedure is 6-9 or preferably 7-8, and the pH value of the liquid phase obtained in the solid-liquid separation procedure is 5-7.

Stand the liquid phase still and then discharge the liquid phase. Standing the liquid phase still is to let $H^+$ and $OH^-$ in the solution to be neutralized into water, reducing the concentration of hypochlorous acid to the national standard before discharging. If the heavy metal in the liquid phase exceeds the standard, use heavy metal absorption fibers to remove heavy metals. After the liquid phase reaches the standards, it is discharged. In this way, the liquid phase can guarantee the pollution-free environment, and can be discharged directly.

The partial neutral solid phase material can be directly removed. Because the solid phase material thus obtained does not contain heavy metals and dioxin, it can be used as a building material or paving roadbed.

The carbonic acid aqueous solution aqueous solution is pumped into the electrocatalytic water equipment through an acid and alkali resistant water pump.

The electrocatalytic water equipment used in the basic oxygen furnace slag treatment method is described hereinafter:

The electrocatalytic water equipment is a reactor for continuous generation of water with high redox properties as disclosed in CN 202265444 U provided by Suzhou Onewide Technology Co., Ltd, China.

The electrocatalytic water equipment comprises N electrocatalytic units numbered from 1 through $N^{th}$ and vertically arranged in a stack and connected in series, wherein N is an integer greater than or equal to 2, and N is an even number. Further, each electrocatalytic unit comprises:

an electrolytic pipeline defining therein an enclosed chamber;

a power source having a positive terminal and a negative terminal;

a positive electrode plate and a negative electrode plate mounted in the enclosed chamber at two opposite lateral sides, and respectively electrically connected to the positive terminal and negative terminal of the power source for creating an electric field in the electrolytic pipeline;

an insulated pipeline mounted in the electrolytic pipeline between the positive electrode plate and the negative electrode plate and comprising a plurality of through holes cut through a peripheral wall thereof;

a filling layer made of a low dielectric constant material and mounted in the insulated pipeline, defining therein a space for the passing of water and defining with the peripheral wall of the insulated pipeline a gap that is disposed in communication with the space and the through holes of the insulated pipeline;

a water inlet located at one end of the electrolytic pipeline of the first electrocatalytic unit; and two lateral water outlets located at two opposite lateral sides of the electrolytic pipeline of the $N^{th}$ electrocatalytic unit near one end thereof and respectively disposed adjacent to the associating positive electrode plate and negative electrode plate.

In the electrocatalytic water equipment, the positive electrode plate and the negative electrode plate are mounted in the electrolytic pipeline. When the positive electrode plate and the negative electrode plate are electrically conducted, electricity is discharged through the positive electrode plate and the negative electrode plate, creating a strong electric field between the positive electrode plate and the negative electrode plate. Under the effect of this strong electric field, the metal oxide catalysts on the positive electrode plate and the negative electrode plate are inducted into semiconductors in the electric field that play the role of catalyst to promote water molecules and oxygen, causing generation of hydrogen ions and hydroxide ions. Thus, the hydroxyl radical content in the electrocatalytic water is greatly increased, making the ability to neutralize heavy metal ions more strong.

Further, the arrangement of the insulated pipeline and the filling layer of low dielectric constant material between the positive electrode plate and the negative electrode plate avoids the positive electrode plate and the negative electrode plate from directly discharging toward the insulated pipeline, allowing ions between the positive electrode plate and the insulated pipeline and ions between the negative electrode plate and the insulated pipeline to move through the insulated pipeline and the filling layer to the corresponding area. Further, the presence of the low dielectric constant material can increase the impedance, making the formation of the electric field between the positive electrode plate and the negative electrode plate more uniform, and thus, the arrangement of the invention significantly improves the uniformity of discharge in water and greatly enhances water electrolysis, thereby reducing power consumption, saving energy and prolonging service life of the positive and negative electrode plates more than 30%.

In the operation of the electrocatalytic water equipment, the positive and negative electrode plates are electrically conducted to discharge electricity. When high voltage electric current goes through the low dielectric constant materials, the low dielectric constant materials are polarized to create a capacitive inductive electric field, greatly increasing the discharge range and improving the effect of discharge, and thus, the generated electrocatalytic water can show high performance in decomposition of organic and toxic substances, bacteria-killing and neutralization of heavy metal ions, and the amount of hydroxyl radicals in the generated electrocatalytic water is high.

Further, lateral water outlets are respectively disposed adjacent to the positive electrode plate and the negative electrode plate so that acidic water and alkaline water can be selected, widening the application range of the electrocatalytic water equipment. Further, the arrangement of the water inlet at the first electrocatalytic unit and the lateral water outlet at the $N^{th}$ electrocatalytic unit enables water to flow through N electrocatalytic units for fully electrolysis, increasing the acidity of the acidic water and the alkalinity of the alkaline water, and enhancing the performance of the electrocatalytic water in decomposition of organic and toxic substances and oil pollutants as well as the bacteria-killing ability.

Further, an end side, water outlet is arranged on the $N^{th}$ electrocatalytic unit and equally spaced from the positive electrode plate and the negative electrode plate, allowing selection of neutral water according to actual need, further expanding the application of the electrocatalytic water equipment.

Further, the end side water outlet 18 at the $N^{th}$ electrocatalytic unit is equally spaced from the positive electrode plate and the negative electrode plate, allowing selection of neutral water according to actual need and expanding the application of the electrocatalytic water equipment.

Preferably, each electrocatalytic unit further comprises first runner defined between the associating positive electrode plate and the associating electrolytic pipeline, and a second runner defined between the associating negative electrode plate and the associating electrolytic pipeline.

In the preferred embodiment of the present invention, the first runner and the second runner are equal in width so that the strength of the created strong electric field can be evenly distributed between the positive electrode plate and the negative electrode plate, thereby improving the efficiency of water electrolysis.

Preferably, the positive electrode plate and the negative electrode plate of each electrocatalytic unit each comprise a plurality of evenly distributed perforations.

Subject to the arrangement of the evenly distributed perforations, water molecules between the positive electrode plate and the electrolytic pipeline and water molecules between the negative electrode plate and the electrolytic pipeline can pass through the positive electrode plate and the negative electrode plate to the strong electric field between the positive electrode plate and the negative electrode plate, so that water molecules in the electrolytic pipeline can be fully catalyzed, improving water catalytic efficiency, and thus, electrolysis of water molecules within the electrolytic pipeline does not have any dead angle.

Further, the positive electrode plate and the negative electrode plate of each electrocatalytic unit each comprise an electrode lug respectively extended from a respective one end thereof remote from the water inlet, and a connection hole located on said electrode lug. The electrode lugs of the positive electrode plate and negative electrode plate of each electrocatalytic unit are respectively electrically connected to the positive terminal and negative terminal of the power source by a respective lead wire.

In the preferred embodiment of the present invention, the electrode lugs of the positive and negative electrode plates are respectively electrically connected to the positive and negative terminals of the power source, and the connection is achieved simply by bonding the respective one ends of the lead wires to the connection holes of the electrode lugs and positive and negative electrode plates and the respective other ends of the lead wires to the positive and negative terminals of the power source, facilitating installation to reduce the cost and enhancing electrical conduction reliability.

Preferably, the power source is selectively a high voltage DC power source of voltage 20V-18000V, or a high voltage AC power source of voltage 20V-23000V.

Preferably, the electrolytic pipeline of each electrocatalytic unit comprises a double open-ended pipeline casing, and two end caps respectively mounted with a respective sealing member on two opposite ends of the double open-ended pipeline casing to form the enclosed chamber in the double open-ended pipeline casing. The arrangement of the sealing members enhances the sealing of the enclosed chamber.

Preferably, the through holes are evenly distributed over the peripheral wall of the insulated pipeline so that the peripheral wall of the insulated pipeline forms a mesh structure.

Preferably, the insulated pipeline is equally spaced between the positive electrode plate and the negative electrode plate, and made of an insulating polymer material selected from the group of unplasticized polyvinyl chloride (UPVC), polyvinyl chloride (PVC), polypropylene (PP) and polytetrafluoroethylene (PTFE).

The above-described structural design of the insulated pipeline can keep the positive ions produced in the discharge or electrolysis process to move to the anode, and the negative ions to move to the cathode, and thus, a large portion of the positive ions can be maintained around the anode and a large portion of the negative ions can be maintained around the cathode.

Preferably, the filling layer comprises a plurality of fillers arranged in closely attached rows. The fillers can be configured to exhibit spherical, cubic or ellipsoidal shape.

In application, the low dielectric constant materials of the insulated pipeline and the filling layer enables the discharging action to be performed uniformly between the positive electrode plate and the negative electrode plate 136, and thus, a large proportion of positive ions in water can be gathered around the anode and a large proportion of negative ions can be separated and concentrated in the vicinity of the cathode without the use of a cation exchange membrane or anion exchange membrane.

Preferably, the fillers are made of a low dielectric constant material selected from the group of glass, alumina, ceramics, corundum porcelain, rutile porcelain and their combinations. The equivalent diameter of the fillers is 6 mm-7 mm.

Preferably, the fillers are respectively used as a carrier and respectively peripherally coated with a layer of catalytic material. The catalytic layer of each filler forms a wet oxidation catalyst in water. This wet oxidation catalyst is disposed in the high voltage electric field created by the positive and negative electrode plates to absorb the energy of the high voltage electric field, forming a wet electric catalyst that has the ability to enhance oxidation and to destruct exhaust gas, facilitating exhaust gas decomposition.

The catalytic layer can be a heterogeneous noble metal catalytic series material, or a transition metal oxide catalytic series material. The heterogeneous noble metal catalytic series material can be selected from the group of the metal oxides of Ru, Rh, Pt, Ir and Pd, and their combinations. The transition metal oxide catalytic series material can be selected from the group of the metal oxides of Cu, Mn, Fe and Zn, and their combinations.

Other advantages and features of the present invention will be fully understood by reference to the following specification in junction with the accompanying drawings, in which like reference signs denote like components of structure.

DETAILED DESCRIPTION OF THE PREFERRED EMBODIMENT

Figure 1:
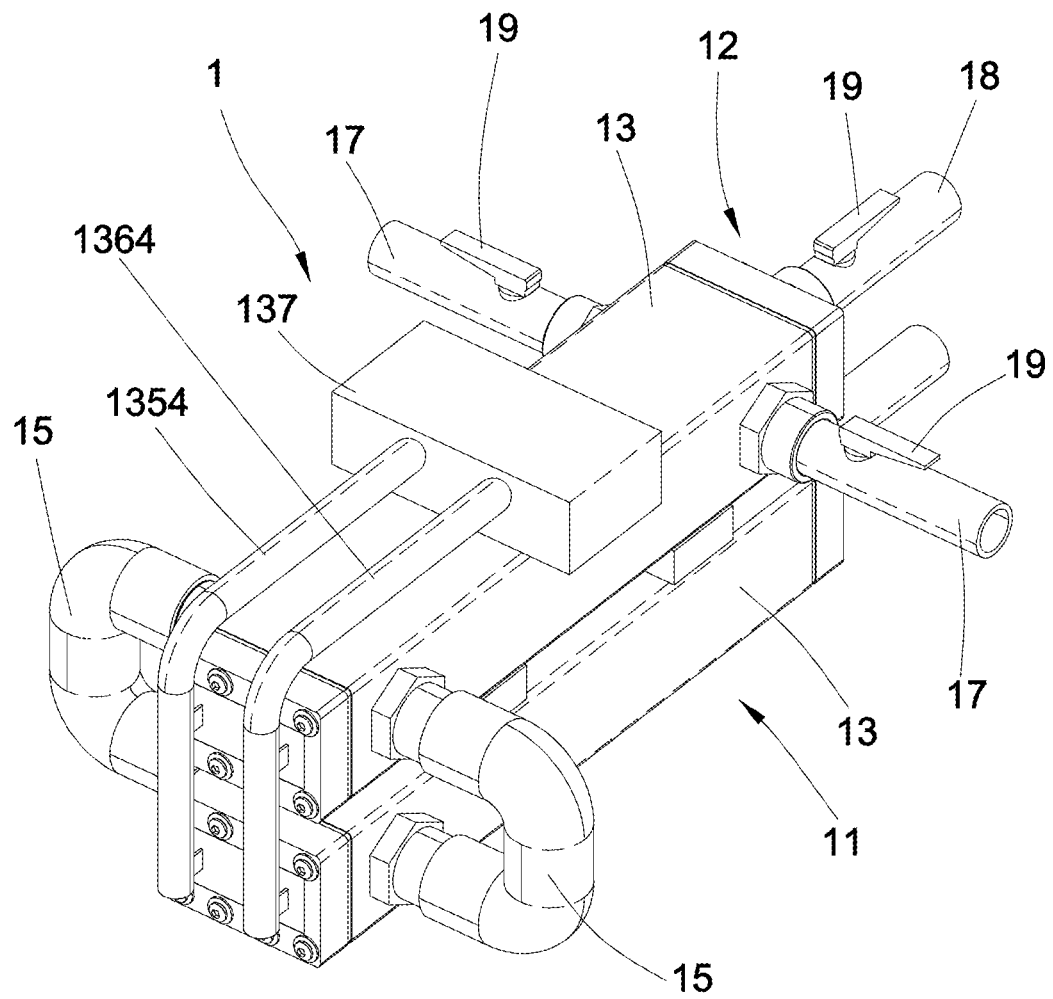
FIG. 1 is a schematic elevational structural view of an electrocatalytic water equipment used in Example I in accordance with the present invention.

The invention is now explained by way of examples, however, these examples are not intended to limit the scope of the invention. If there are no specific conditions specified in the following examples, select according to conventional methods and conditions, or in accordance with the product specification.

In the specification of the present invention, the terminology "up", "down", "front", "back", "left", "right", "vertical", "horizontal", "top", "bottom", "internal", "external" are based on the azimuth or positional relationship shown in the drawings, simply for illustration to facilitate the description of the invention rather than indicating or implying that the device or element referred to must have a specific orientation or be constructed and operated in a particular orientation, and therefore they cannot be construed as limiting the present invention.

EXAMPLE I

In Example I, the basic oxygen furnace slag treatment method comprises the steps of: (i) mixing basic oxygen furnace slag with active aqueous solution A uniformly, (ii) enabling the mixture to react under an enclosed environment for 3 hours, and (iii) employing a solid-liquid separation procedure to separate solid phase from liquid phase. Further, the pH value of active aqueous solution is 1.5. The active aqueous solution is obtained from carbonic acid aqueous solution aqueous solution by a treatment through an electrocatalytic water equipment. Further, the mass ratio between basic oxygen furnace slag and active aqueous solution A is 1:5.

In the preparation of active aqueous solution A, carbonic acid aqueous solution aqueous solution is obtained by diluting carbonic acid aqueous solution with water. The concentration of carbonic acid aqueous solution aqueous solution is 0.3%, and the percentage is mass percentage. The pH value of carbonic acid aqueous solution aqueous solution is 5. Further, carbonic acid aqueous solution aqueous solution is circulated in electrocatalytic water equipment for 20 minutes.

In the preparation of active aqueous solution A, an electrochemical reaction is created in the electrocatalytic water equipment as follow:

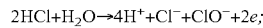
$2HCl + H_2O \rightarrow 4H^+ + Cl^- + ClO^- + 2e;$

When using active aqueous solution A to treat basic oxygen furnace slag, reactions created between basic oxygen furnace slag and active aqueous solution A include CaO reaction to form $CaCl_2$ and $Ca(ClO)_2$, MgO reaction to form $MgCl_2$ and $Mg(ClO)_2$, $K_2O$ reaction to form KCl and KClO. Specific reaction equations are exemplified below:

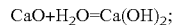
$CaO + H_2O = Ca(OH)_2;$

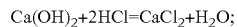
$Ca(OH)_2 + 2HCl = CaCl_2 + H_2O;$

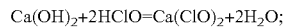
$Ca(OH)_2 + 2HClO = Ca(ClO)_2 + 2H_2O;$

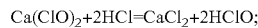
$Ca(ClO)_2 + 2HCl = CaCl_2 + 2HClO;$

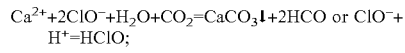
$Ca^{2+} + 2ClO^- + H_2O + CO_2 = CaCO_3 \downarrow + 2HCO \text{ or } ClO^- + H^+ = HClO;$

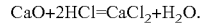
$CaO + 2HCl = CaCl_2 + H_2O.$

The pH values of the solid phase and liquid phase thus obtained in the solid-liquid separation step are 7-8 solid phase and 5-7 for liquid phase.

Stand the liquid phase still and then discharge the liquid phase. Standing the liquid phase still is to let $H^+$ and $OH^-$ in the solution to be neutralized into water, reducing the concentration of hypochlorous acid to the national standard before discharging. If the heavy metal in the liquid phase exceeds the standard, use heavy metal absorption fibers to remove heavy metals. After the liquid phase reaches the standards, it is discharged. In this way, the liquid phase can guarantee the pollution-free environment, and can be discharged directly.

The partial neutral solid phase material can be directly removed. Because the solid phase material thus obtained does not contain heavy metals and dioxin, it can be used as a building material or paving roadbed.

The said carbonic acid aqueous solution aqueous solution is pumped into the electrocatalytic water equipment through an acid and alkali resistant water pump.

Figure 2:
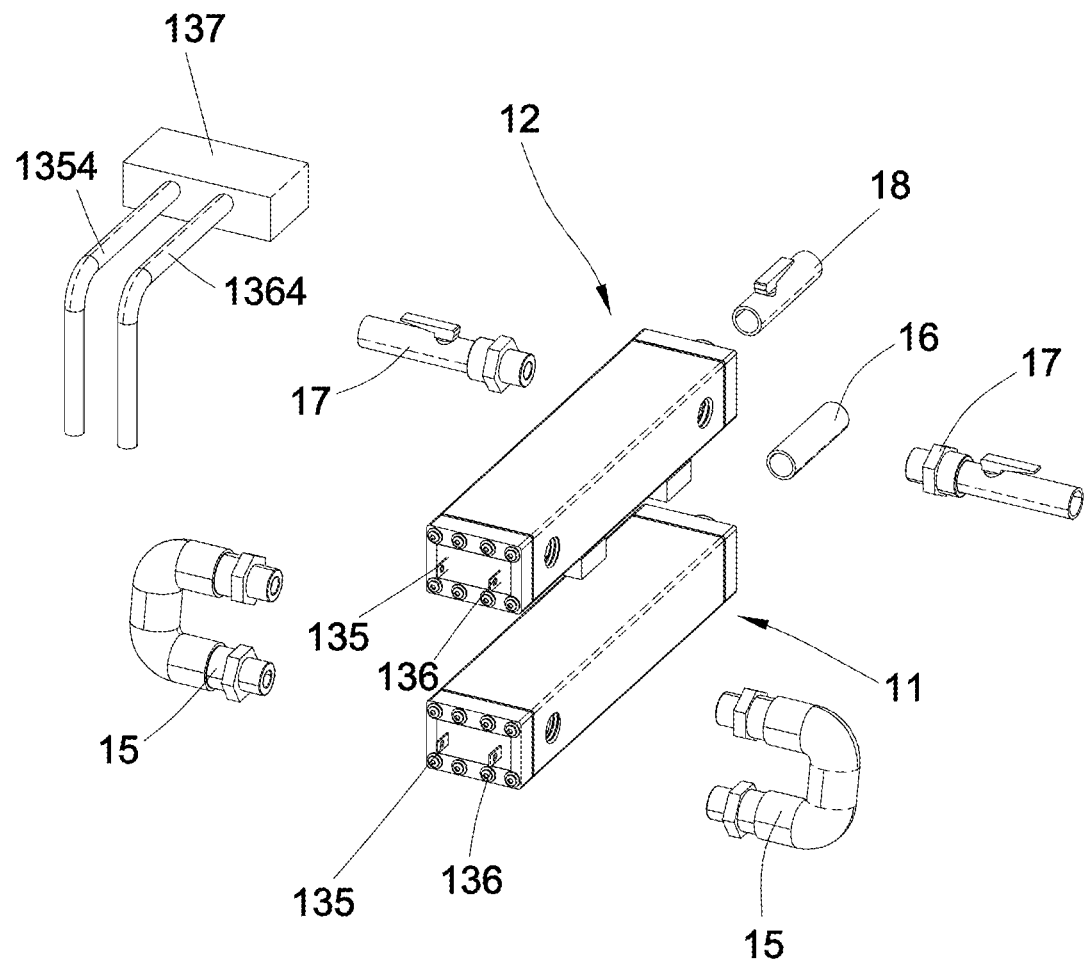
FIG. 2 is an exploded view of the electrocatalytic water equipment shown in FIG. 1.
Figure 3:
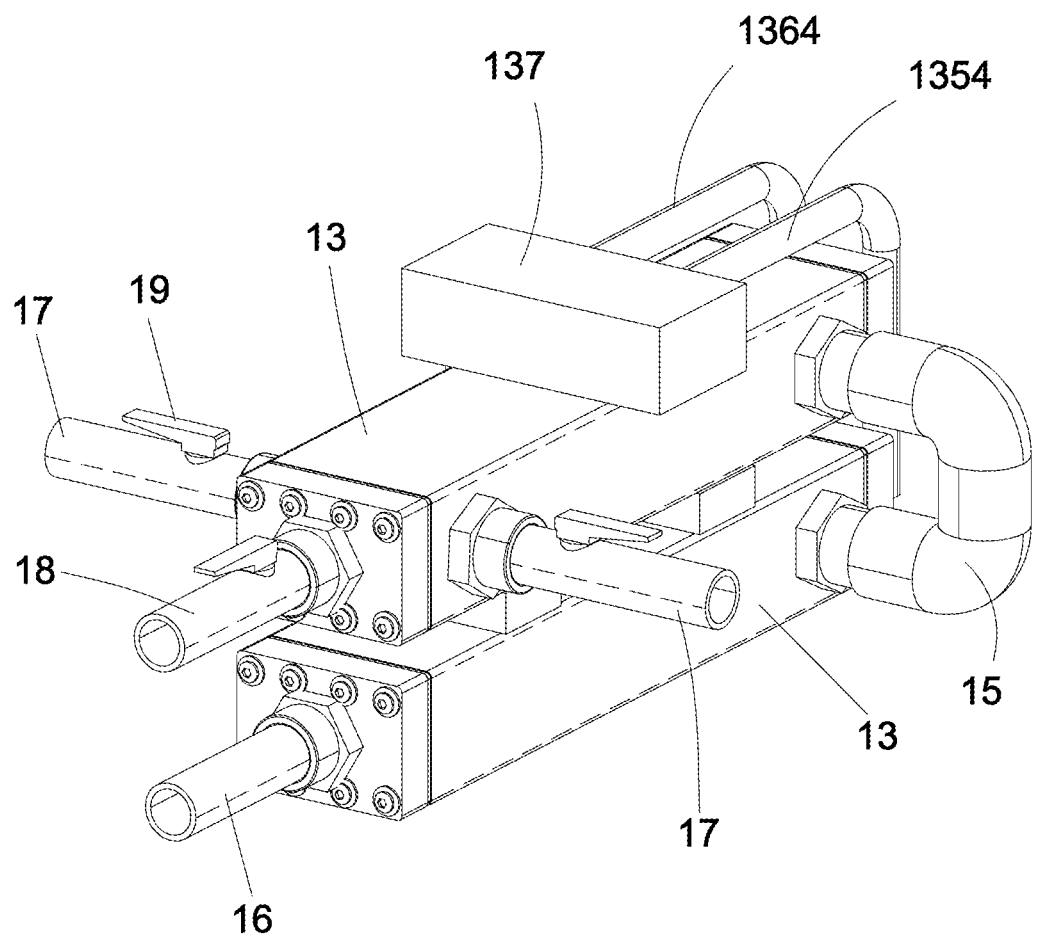
FIG. 3 corresponds to FIG. 1 when viewed from another angle.

FIGS. 1, 2 and 3 illustrate the structure of the electrocatalytic water equipment 1 used in Example I. The electrocatalytic water equipment 1 includes a set of N electrocatalytic units 11,12 vertically arranged in a stack and connected in series with connection water pipes 15, wherein N is an integer greater than or equal to 2, and N is an even number. In Example I, N is 2.

Figure 4:
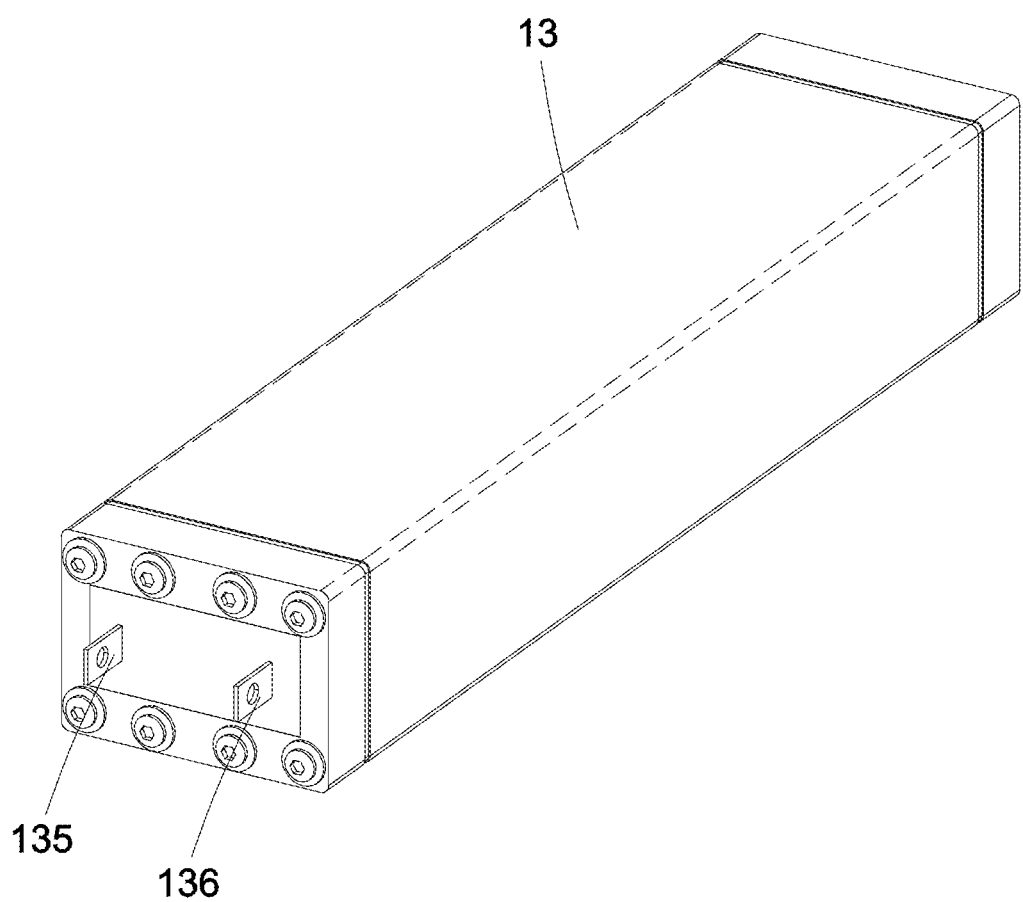
FIG. 4 is a schematic elevational structural view of one single electrocatalytic unit of the electrocatalytic water equipment shown in FIG. 1.
Figure 5:
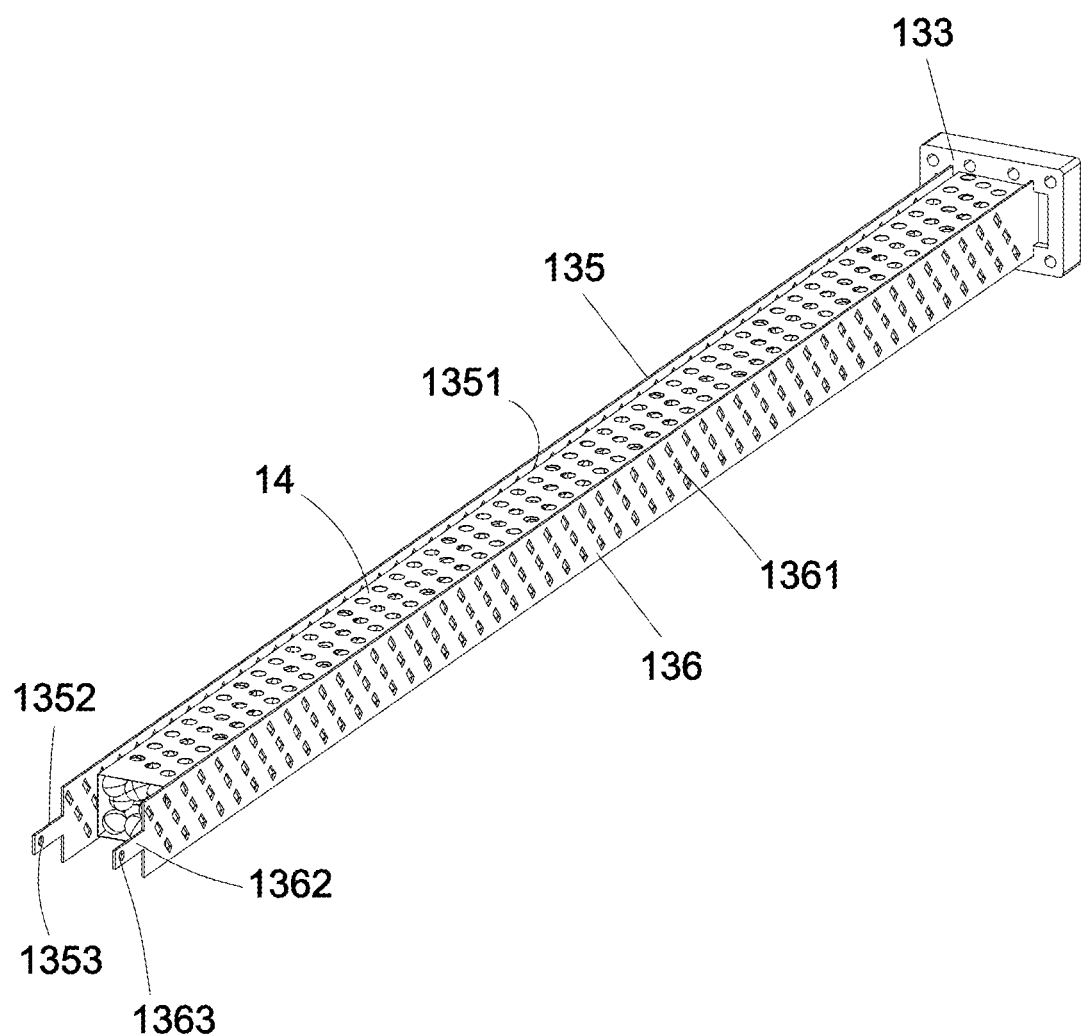
FIG. 5 is a schematic drawing illustrating the internal structure of the electrocatalytic unit shown in FIG. 4.

As illustrated in FIG. 4 and FIG. 5, each electrocatalytic unit 11,12 comprises: an electrolytic pipeline 13 and an insulated pipeline 14. The electrolytic pipeline 13 defines therein an enclosed chamber 131. In actual use, the enclosed chambers 131 of the electrocatalytic units 11,12 are disposed in communication with each other (one another) through the connection water pipes 15, so that intake water coming from the water inlet 16 can flow through each electrocatalytic unit 11,12, thereby improving the catalytic efficiency, and ensuring full electrolysis of water molecules.

Figure 10:
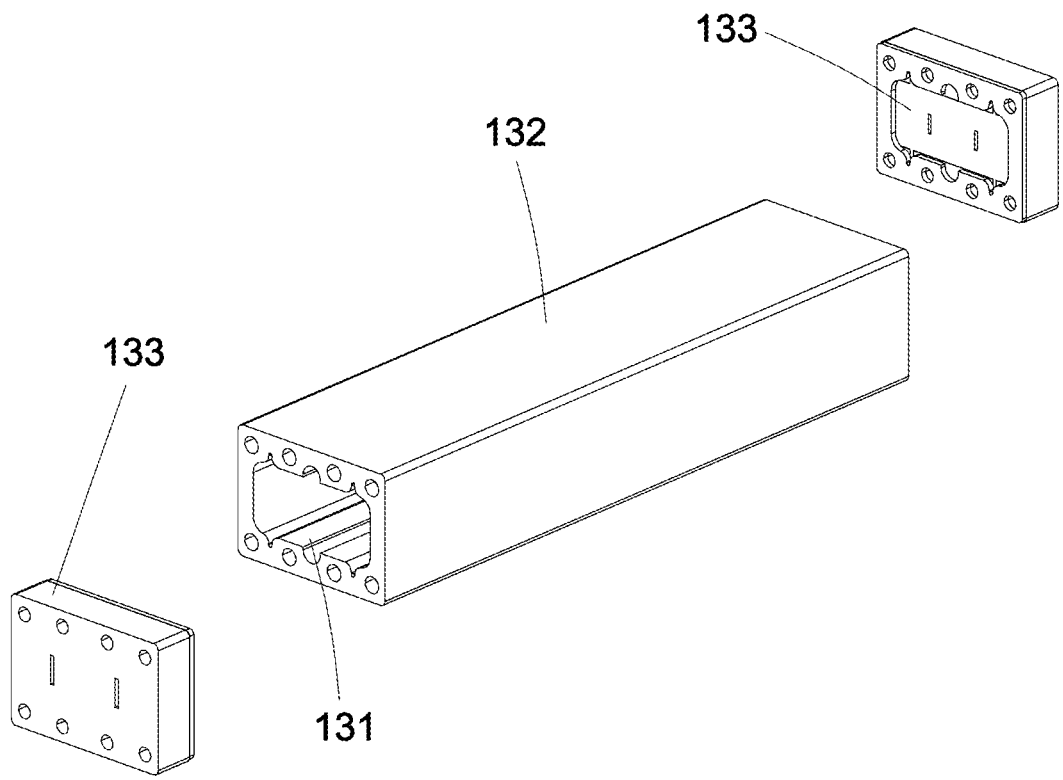
FIG. 10 is an exploded view of the electrolytic pipeline shown in FIG. 4.

Referring to FIG. 10, each electrolytic pipeline 13 comprises a double open-ended pipeline casing 132 and two end caps 133. The two end caps 133 are respectively mounted with a sealing member (not shown), and then respectively fastened to the two opposite ends of the double open-ended pipeline casing 132 in an airtight manner to create the enclosed chamber 131 in the double open-ended pipeline casing 132. The arrangement of the sealing member enhances the water-tightness of the enclosed chamber 131, avoiding water leakage.

Further, a positive electrode plate 135 and a negative electrode plate 136 are mounted in the enclosed chamber 131 at two opposite sides. Preferably, the positive electrode plate 135 and the negative electrode plate 136 are respectively attached to the inner surfaces of two opposite side walls of the double open-ended pipeline casing 132 of the electrolytic pipeline 13 for creating an electric field in the electrolytic pipeline 13. Further, the positive electrode plate 135 and the negative electrode plate 136 are respectively electrically connected to opposing positive and negative terminals of a power source 137.

Further, a first runner and a second runner are respectively defined between the positive electrode plate 135 and one side wall of the electrolytic pipeline 13 and between the negative electrode plate 136 the opposite side wall of the electrolytic pipeline 13. The first runner and the second runner have the same width so that the strong electric field created between the positive electrode plate 135 and the negative electrode plate 136 is more uniform, thereby improving the efficiency of water electrolysis.

Figure 7:
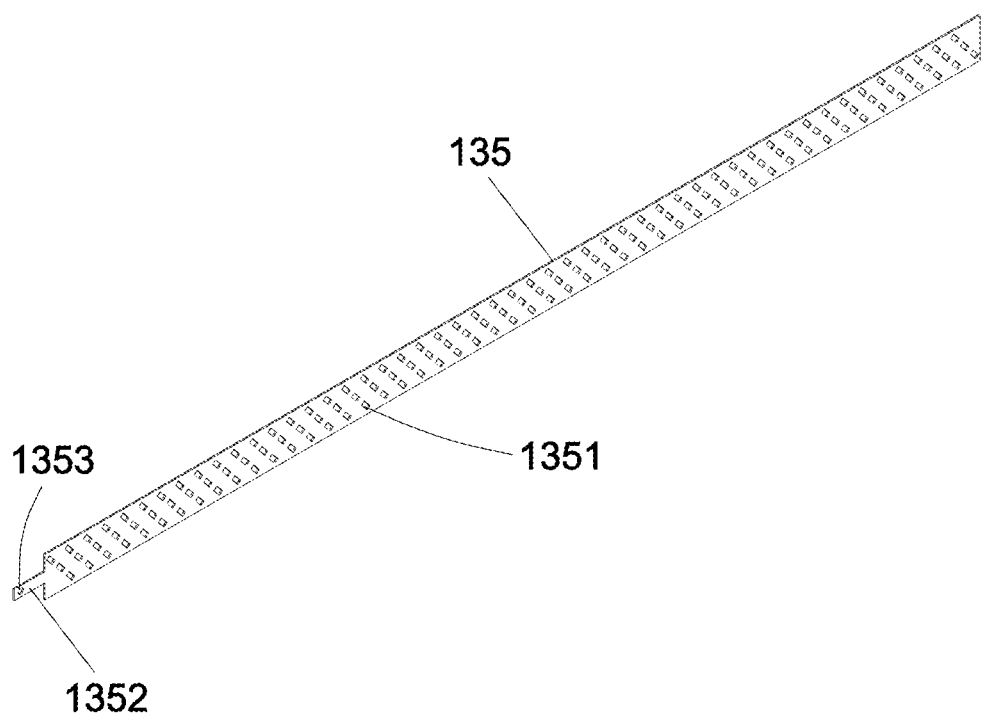
FIG. 7 is a schematic elevational structural view of the positive electrode plate shown in FIG. 5.

As illustrated in FIG. 5 and FIG. 7, the positive electrode plate 135 and the negative electrode plate 136 are configured to provide evenly distributed perforations 1351,1361. Subject to the arrangement of these perforations 1351,1361, water molecules between the positive electrode plate 135 and the electrolytic pipeline 13 and water molecules between the negative electrode plate 136 and the electrolytic pipeline 13 can pass through the positive electrode plate 135 and the negative electrode plate 136 to the strong electric field between the positive electrode plate 135 and the negative electrode plate 136, so that water molecules in the electrolytic pipeline 13 can be fully catalyzed, improving water catalytic efficiency, and thus, electrolysis of water molecules within the electrolytic pipeline 13 does not have any dead angle.

Referring to FIG. 5 and FIG. 7, the positive electrode plate 135 and the negative electrode plate 136 respectively have an electrode lug 1352,1362 outwardly extended from one end thereof remote from the water inlet 16, and a connection hole 1353,1363 located on the electrode lug 1352,1362. Lead wires 1354,1364 are respectively fastened to the connection holes 1353,1363 to respectively electrically connect the electrode lugs 1352,1362 the positive and negative electrode plates 135,136 to the positive and negative terminals of the power source 137. The power source 137 is mounted at a top wall of the second electrocatalytic unit 12.

In this embodiment, the electrode lugs 1352,1362 of the positive electrode plate 135 and negative electrode plate 136 are respectively electrically connected to the positive and negative terminals of the power source 137, and the connection is achieved simply by bonding the respective one ends of the lead wires 1354,1364 to the connection holes 1353,1363 of the electrode lugs 1352,1362 and positive electrode plate 135 and the respective other ends of the lead wires 1354,1364 to the positive and negative terminals of the power source 137, facilitating installation to reduce the cost and enhancing electrical conduction reliability.

In this example, the power source 137 is a high voltage DC power source. The voltage of the power source 137 is 20V-18000V, or preferably 50V-15000V. Further, according to actual requirements, the power source 137 can be a high voltage AC power source of voltage 20V-23000V, or preferably 50V-20000V.

Figure 6:
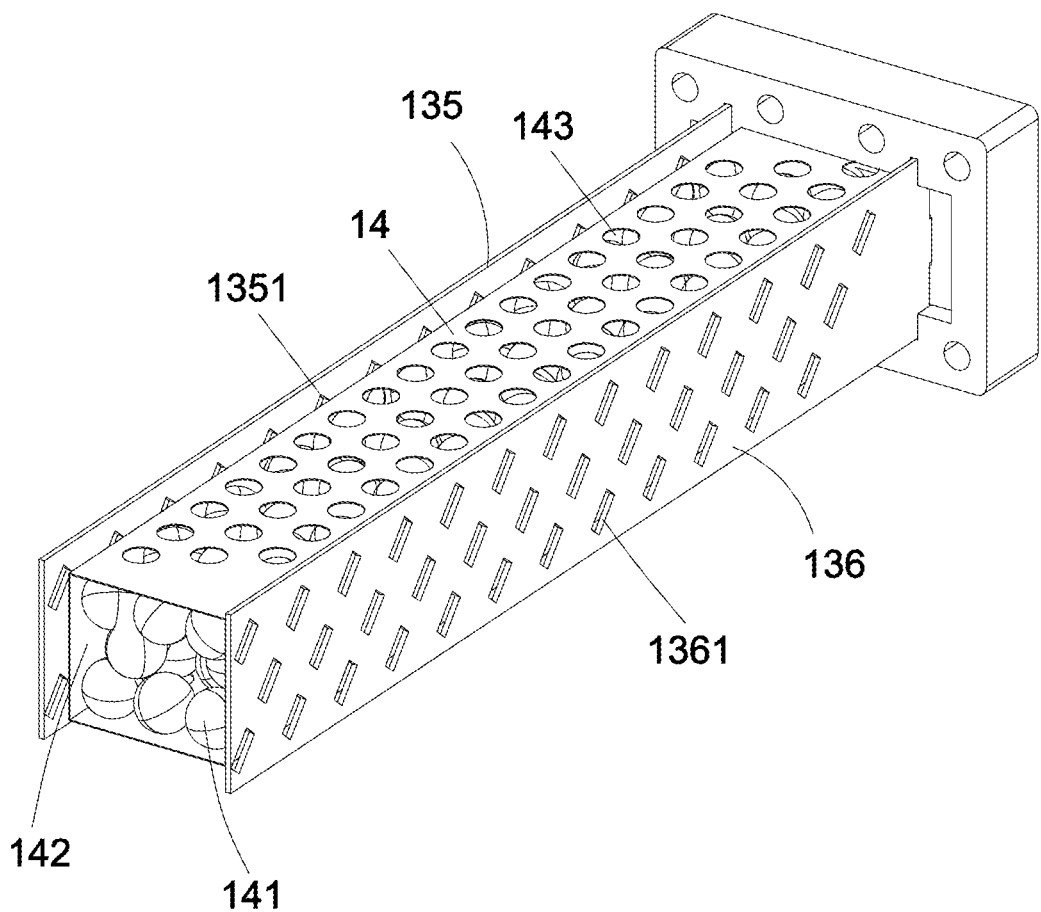
FIG. 6 is a sectional elevation, in an enlarged scale, of the electrocatalytic unit shown in FIG. 5.
Figure 8:
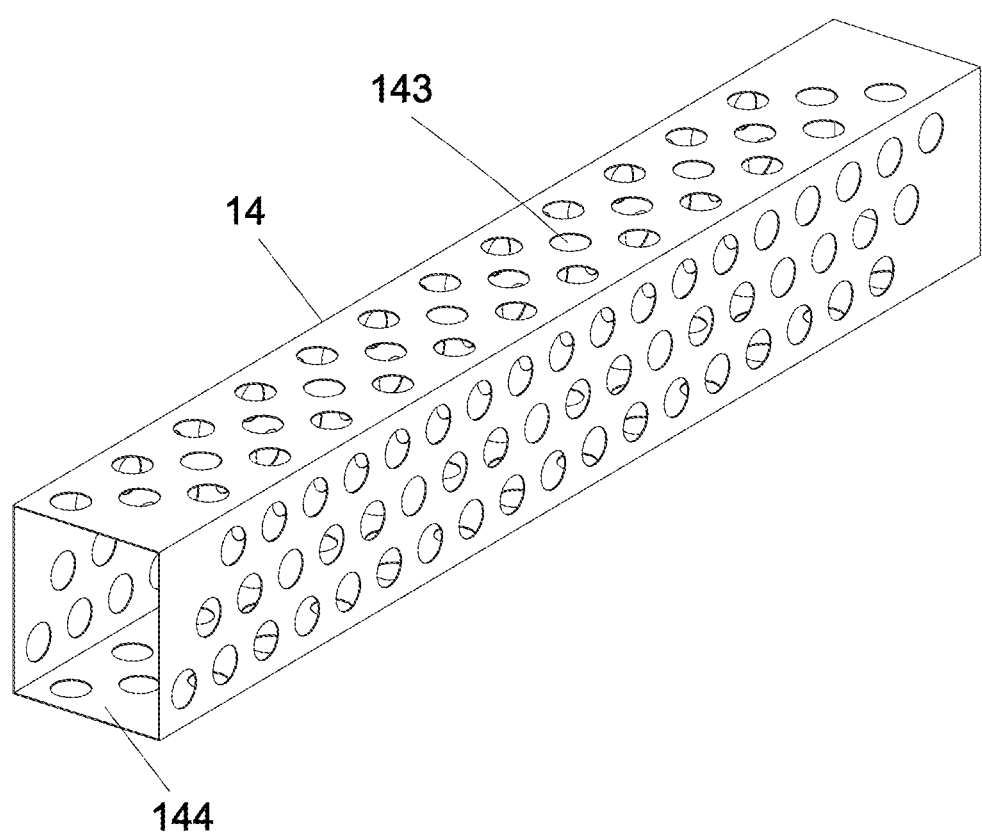
FIG. 8 is a schematic structural view of a part of the insulated pipeline shown in FIG. 5.

As illustrated in FIG. 5 and FIG. 6, the insulated pipeline 14 is positioned between the positive electrode plate 135 and the negative electrode plate 136 having a having a filling layer 141 of low dielectric constant material stuffed therein. The filling layer 141 defines therein a space 1411 for the flowing of water. Further, a gap 142 is defined between the filling layer 141 and one side wall of the insulated pipeline 14 and kept in communication with the space 1411. The insulated pipeline 14 has a plurality of through holes 143 located on the peripheral wall and disposed in communication with the gap 142. In the embodiment shown in FIG. 8, the insulated pipeline 14 defines therein a cavity 144; further, the two opposite ends of the insulated pipeline 14 are open ends; further, the insulated pipeline 14 has a rectangular cross section.

The through holes 143 are evenly distributed over the peripheral wall of the insulated pipeline 14, forming a mesh structure. The diameter of these through holes 143 is preferably within the range of 5 mm-6 mm. The insulated pipeline 14 is equally spaced between the positive electrode plate 135 and the negative electrode plate 136. Further, the insulated pipeline 14 is made of an insulating polymer material, preferably unplasticized polyvinyl chloride (UPVC), polyvinyl chloride (PVC), polypropylene (PP) or polytetrafluoroethylene (PTFE), thus, in application, the arrangement of the insulated pipeline 14 allows proper movement of positive ions generated due to discharge or electrolysis toward the anode (i.e., the location of the positive electrode plate 135) and proper movement of positive ions toward the cathode (i.e., the location of the negative electrode plate 136), keeping a large part of positive ions close to the anode, and negative ions close to the cathode.

Figure 9:
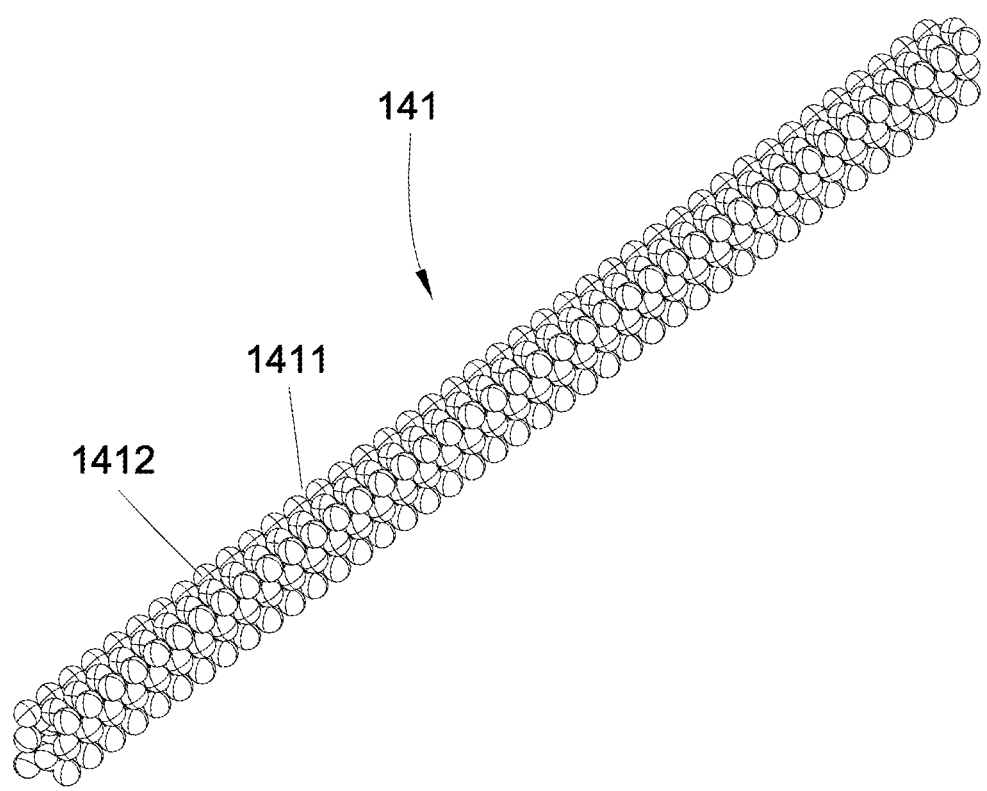
FIG. 9 is a schematic structural view of the filling layer shown in FIG. 5.

Further, as illustrated in FIG. 9, the filling layer 141 comprises a plurality of fillers 1412 arranged in closely attached rows. The shape of the fillers 1412 can be spherical, cubic or ellipsoidal. Further, these fillers 1412 are made of a low dielectric constant material selected from the group of glass, alumina, ceramics, corundum porcelain, rutile porcelain and their combinations. The equivalent diameter of the fillers 1412 is 6 mm-7 mm. In actual application, the diameter of the fillers 1412 matches the diameter of the through holes 143. Normally, the diameter of the fillers 1412 is larger than the diameter of the through holes 143.

In application, the low dielectric constant materials of the insulated pipeline 14 and the filling layer 141 enables the discharging action to be performed uniformly between the positive electrode plate 135 and the negative electrode plate 136, and thus, a large proportion of positive ions in water can be gathered around the anode and a large proportion of negative ions can be separated and concentrated in the vicinity of the cathode without the use of a cation exchange membrane or anion exchange membrane.

Further, each filler 1412 is peripherally covered with a catalytic layer. The fillers 1412 are respectively used as a carrier and respectively peripherally coated with a layer of catalytic material. The catalytic layer of each filler 1412 forms a wet oxidation catalyst in water. This wet oxidation catalyst is disposed in the high voltage electric field created by the positive and negative electrode plates to absorb the energy of the high voltage electric field, forming a wet electric catalyst that has the ability to enhance oxidation and to destruct exhaust gas, facilitating exhaust gas decomposition.

Further, the material of the catalytic layer is a heterogeneous noble metal catalytic series material selected from the group of the metal oxides of Ru, Rh, Pt, Ir and Pd, and their combinations. In actual application, the catalytic layer can also be a transition metal oxide catalytic series material selected from the group of the metal oxides of Cu, Mn, Fe and Zn, and their combinations.

Referring to FIGS. 1-3 again, the electrolytic pipeline 13 of the first electrocatalytic unit 11 has a water inlet 16 located at its one end; the double open-ended pipeline casing 132 of the electrolytic pipeline 13 of the second electrocatalytic unit 12 has a lateral water outlet 17 located on each of two opposite sides thereof and respectively disposed adjacent to the positive electrode plate 135 and the negative electrode plate 136. In this embodiment, the water inlet 16 is located at the end remote from the electrode lugs 1352, 1362; the lateral water outlets 17 and the water inlet 16 are disposed at the same side of the electrocatalytic water equipment 1.

Further, the electrolytic pipeline 13 of the second electrocatalytic unit 12 further comprises an end side water outlet 18 located at one end cap 133 thereof adjacent to the lateral water outlets 17. The end side water outlet 18 is equally spaced between the two lateral water outlets 17. Further, the end side water outlet 18 and the two lateral water outlets 17 are disposed at the same end of the electrolytic pipeline 13. Further, the positive electrode plate 135 and the negative electrode plate 136 are equally spaced from the axis of the end side water outlet 18. In this embodiment, the end side water outlet 18 and the water inlet 16 are disposed at the same end of the electrocatalytic water equipment 1.

Further, a control valve 19 is mounted at each of the lateral water outlets 17 and the end side water outlet 18 for flow rate control.

In application, electrically connect the positive electrode plate 135 to the positive terminal of the power source 137 with a first lead wire 1354 and electrically connect the negative electrode plate 136 to the negative terminal of the power source 137 with a second lead wire 1364. When electrically conducted, electricity is discharged through the positive electrode plate 135 and the negative electrode plate 136, creating a strong electric field between the positive electrode plate 135 and the negative electrode plate 136.

Under the effect of this strong electric field, the metal oxide catalysts on the positive electrode plate 135 and the negative electrode plate 136 are inducted into semiconductors in the electric field that play the role of catalyst to promote water molecules and oxygen, causing generation of hydrogen ions and hydroxide ions. At the same time, the presence of low dielectric constant materials greatly increases the range of discharge, making the electric field formed between the positive electrode plate 135 and the negative electrode plate 136 more uniform. Thus, the electrolysis of the water molecules is made more completely, thereby allowing the hydrogen ions in the water molecules to move through the insulated pipeline 14 and the filling layer 141 to the positive electrode plate 135, and thus acidic water is ultimately formed near the positive electrode plate 135. Accordingly, the hydroxide ions are moved through the insulated pipeline 14 and filling layer 141 to the negative electrode plate 136, causing formation of alkaline water in the vicinity of the negative electrode plate 136, and neutral water in the vicinity of the insulated pipeline 14 and the filling layer 141.

In this example, the electrocatalytic water equipment 1 has the following technical effects:

1. The positive electrode plate 135 and the negative electrode plate 136 are arranged in the electrolytic pipeline 13 so that when the positive electrode plate 135 and the negative electrode plate 136 are electrically conducted, a strong electric field is created between the positive electrode plate 135 and the negative electrode plate 136, thus, the metal oxide catalysts on the positive electrode plate 135 and the negative electrode plate 136 can be inducted into semiconductors that play the role of catalyst to promote water molecules and oxygen in generation of hydrogen ions and hydroxide ions, thereby increasing the content of hydroxyl radicals in the electrocatalytic water and enhancing the ability to neutralize heavy metal ions.

2. The arrangement of the insulated pipeline 14 and the filling layer 141 of low dielectric constant material between the positive electrode plate 135 and the negative electrode plate 136 avoids the positive electrode plate 135 and the negative electrode plate 136 from directly discharging toward the insulated pipeline 14, allowing ions between the positive electrode plate 135 and the insulated pipeline 14 and ions between the negative electrode plate 136 and the insulated pipeline 14 to move through the insulated pipeline 14 and the filling layer 141 to the corresponding area; the presence of the low dielectric constant material can increase the impedance, making the formation of the electric field between the positive electrode plate 135 and the negative electrode plate 136 more uniform, and thus, the arrangement of the invention significantly improves the uniformity of discharge in water and greatly enhances water electrolysis, thereby reducing power consumption, saving energy and prolonging service life of the positive and negative electrode plates more than 30%.

3. In the operation of the electrocatalytic water equipment 1, the positive and negative electrode plates are electrically conducted to discharge electricity; when high voltage electric current goes through the low dielectric constant materials, the low dielectric constant materials are polarized to create a capacitive inductive electric field, greatly increasing the discharge range and improving the effect of discharge, and thus, the generated electrocatalytic water can show high performance in decomposition of organic and toxic substances, bacteria-killing and neutralization of heavy metal ions, and the amount of hydroxyl radicals in the generated electrocatalytic water is high.

4. Lateral water outlets 17 are respectively disposed adjacent to the positive electrode plate 135 and the negative electrode plate 136 so that acidic water and alkaline water can be selected, widening the application range of the electrocatalytic water equipment 1; the arrangement of the water inlet 16 at the first electrocatalytic unit 11 and the lateral water outlets 17 at the $N^{th}$ electrocatalytic unit enables water to flow through N electrocatalytic units for fully electrolysis, increasing the acidity of the acidic water and the alkalinity of the alkaline water, and enhancing the performance of the electrocatalytic water in decomposition of organic and toxic substances and oil pollutants as well as the bacteria-killing ability.

5. The arrangement of the end side water outlet 18 on the $N^{th}$ electrocatalytic unit is equally spaced from the positive electrode plate 135 and the negative electrode plate 136, allowing selection of neutral water according to actual need and expanding the application of the electrocatalytic water equipment 1.

EXAMPLE II

In Example II, the basic oxygen furnace slag treatment method comprises the steps of: (i) mixing basic oxygen furnace slag with active aqueous solution B uniformly, (ii) enabling the mixture to react under an enclosed environment for 5 hours, and (iii) employing a solid-liquid separation procedure to separate solid phase from liquid phase. Further, the pH value of active aqueous solution B is 6; carbonic acid aqueous solution is prepared through the electrocatalytic water equipment; the mass ratio between basic oxygen furnace slag and active aqueous solution B is 1:10.

In the preparation of active aqueous solution B, carbonic acid aqueous solution is prepared by diluting carbon dioxide with water; the concentration of carbonic acid aqueous solution is 15%, and the percentage is mass percentage; the pH value of carbonic acid aqueous solution is 6; the circulation time of carbonic acid aqueous solution in the electrocatalytic water equipment is 20 minutes.

In the preparation of active aqueous solution B, the following electrochemical reaction is created in the electrocatalytic water equipment 2:

$$H_2CO_3 \rightarrow H_2O + CO_2\uparrow$$

When using active aqueous solution B to treat basic oxygen furnace slag, reactions are created between basic oxygen furnace slag and active aqueous solution B as follows:

$$CaO + H_2O = Ca(OH)_2;$$

$$Ca(OH)_2 + CO_2 = CaCO_3\downarrow + H_2O;$$

$$MgO + H_2O = Mg(OH)_2;$$

$$Mg(OH)_2 + 2CO_2 = Mg(HCO_3)_2.$$

$Mg(HCO_3)_2$ produced after the reactions is processed through positive-liquid separation procedure, and then exposed to remove water, and thus the following reaction is generated:

$$Mg(HCO_3)_2 = MgCO_3 + H_2O + 2CO_2\uparrow$$

Figure 11:
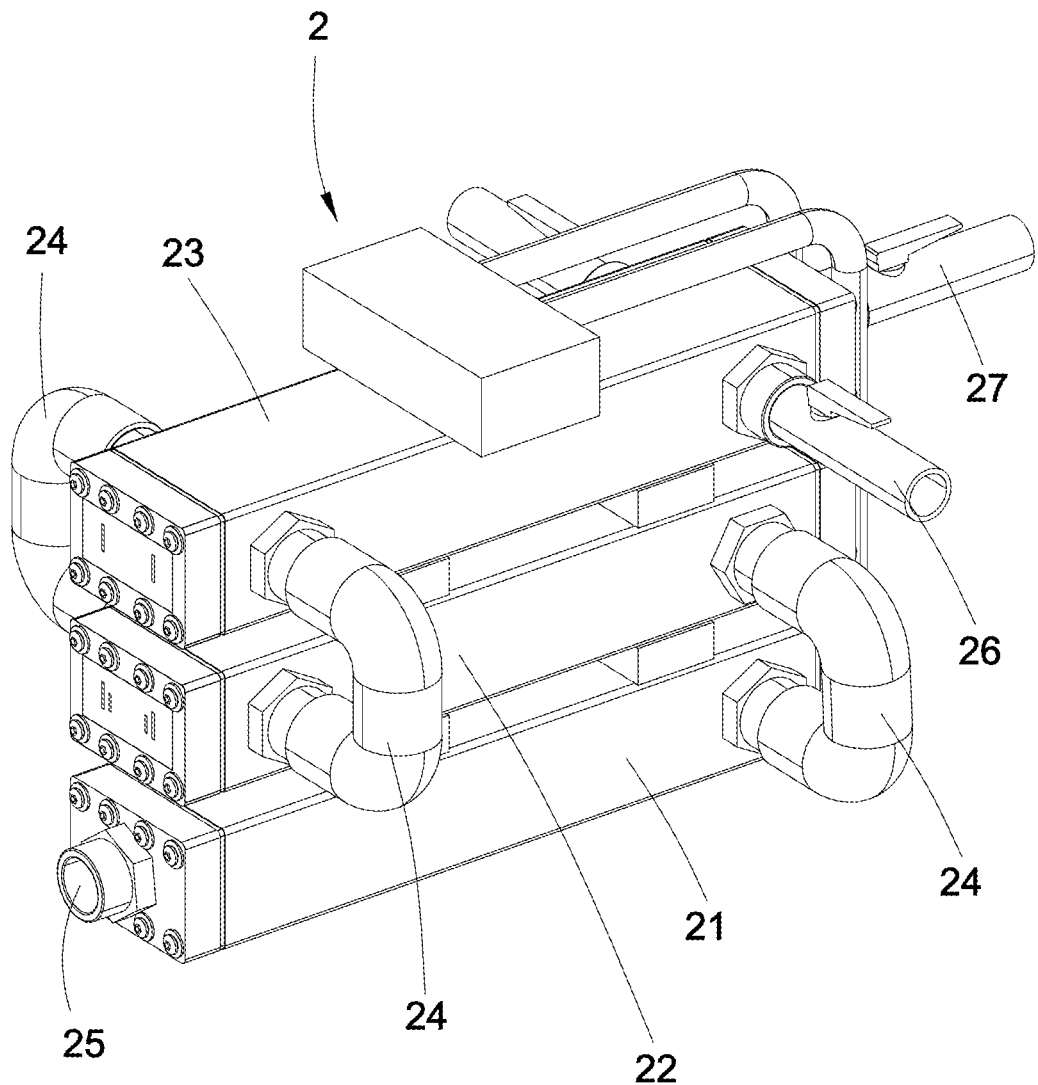
FIG. 11 is a schematic elevational structural view of an electrocatalytic water equipment used in Example II in accordance with the present invention.
Figure 12:
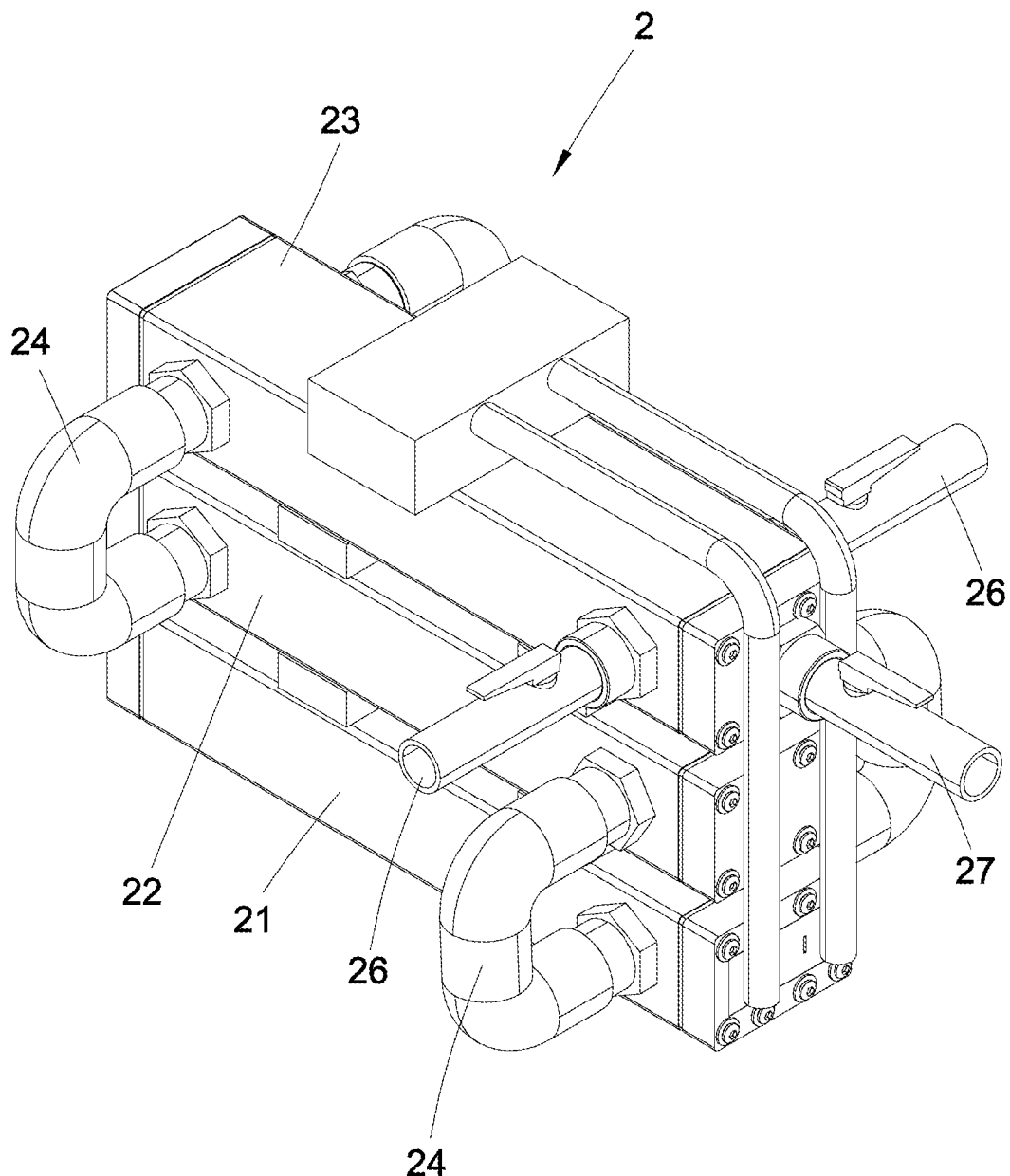
FIG. 12 corresponds to FIG. 11 when viewed from another angle.

The electrocatalytic water equipment 2 used in Example II is substantially similar to the electrocatalytic water equipment 1 used in Example I with the differences as described hereinafter. As illustrated in FIG. 11 and FIG. 12, the electrocatalytic water equipment 2 comprises N electrocatalytic units 21,22,23 vertically arranged in a stack and connected to one another in series with connection water pipes 24, wherein N is an integer greater than or equal to 2, and N is an even number. In Example II, N is 3.

The water inlet 25 is located at one end of the first electrocatalytic unit 21 remote from the electrode lugs 1352,1362; the two lateral water outlets 26 and the end side water outlet 27 are arranged around one end of the third electrocatalytic unit 23 and disposed near the electrode lugs 1352,1362.

Further, the two lateral water outlets 26 and the end side water outlet 27 are respectively located at the end of the electrocatalytic water equipment 2 remote from the water inlet 25.

The electrocatalytic water equipment 2 of the present invention and a conventional electrocatalytic water equipment were tested under the same conditions to examine the performance in decomposition of organic and toxic substances, decomposition of oil pollutants and bacteria-killing ability.

The test results are indicated in the following Table II.

TABLE II

Performance comparison between electrocatalytic water equipment of the invention and electrocatalytic water equipment of the prior art.

| Parameters | Electrocatalytic water equipment of the invention vs electrocatalytic water equipment of the prior art |
|---|---|
| Ability in decomposition of organic and toxic substances and oil pollutants, bacteria-killing | Increased by 50% up |
| Service life of positive electrode plate and negative electrode plate | Increased by 30% up |
| Efficiency of water electrolysis | Increased by 30% up |
| Power saving | Increased by 30% up |
| Generation of hydrogen free radical | Increased by 40% up |

EXAMPLE III

The basic oxygen furnace slag treatment method in accordance with Example III is substantially similar to Example I with the exception that the reaction time is simply 0.2 hour; the pH value of active aqueous solution A is 1; the mass ratio between basic oxygen furnace slag and active aqueous solution A is 1:0.5.

Figure 13:
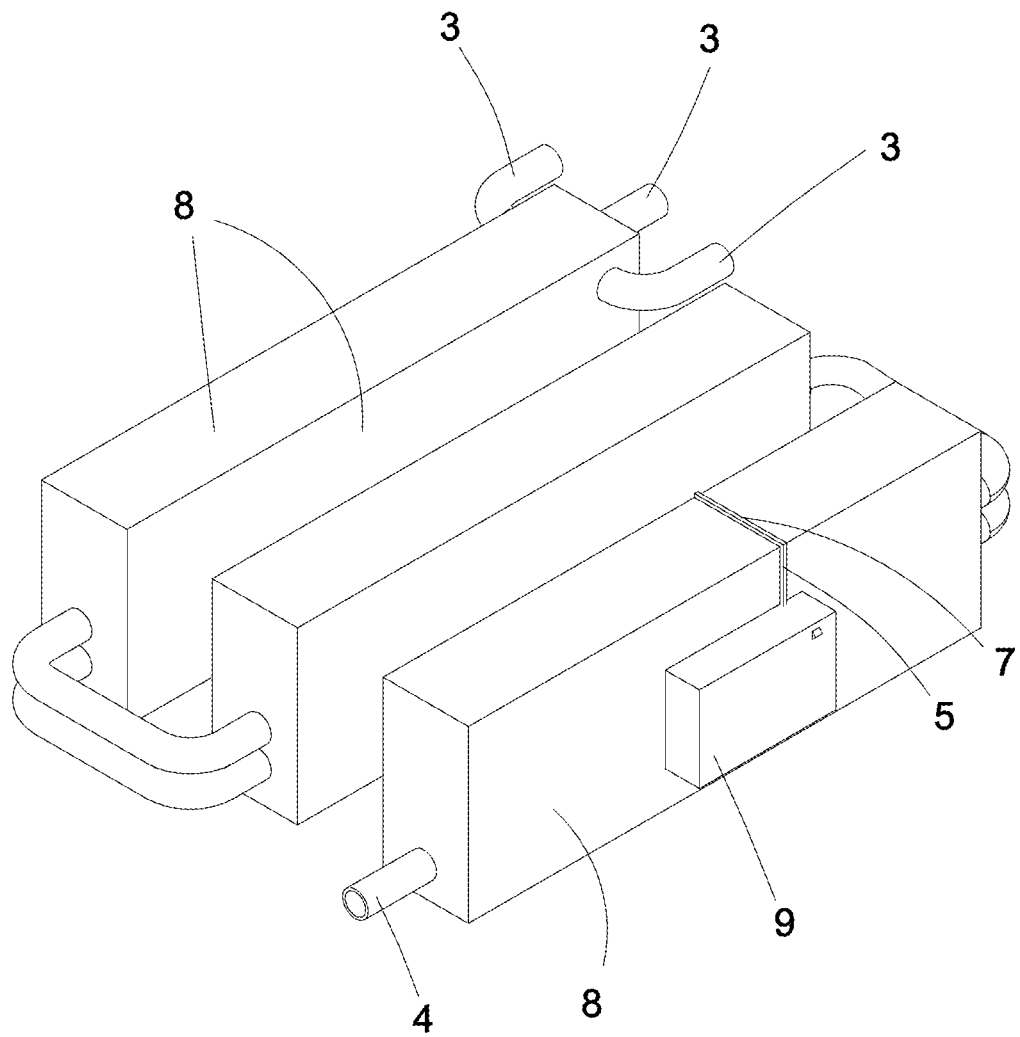
FIG. 13 is a schematic elevational structural view of an electrocatalytic water equipment used in Example III in accordance with the present invention.
Figure 14:
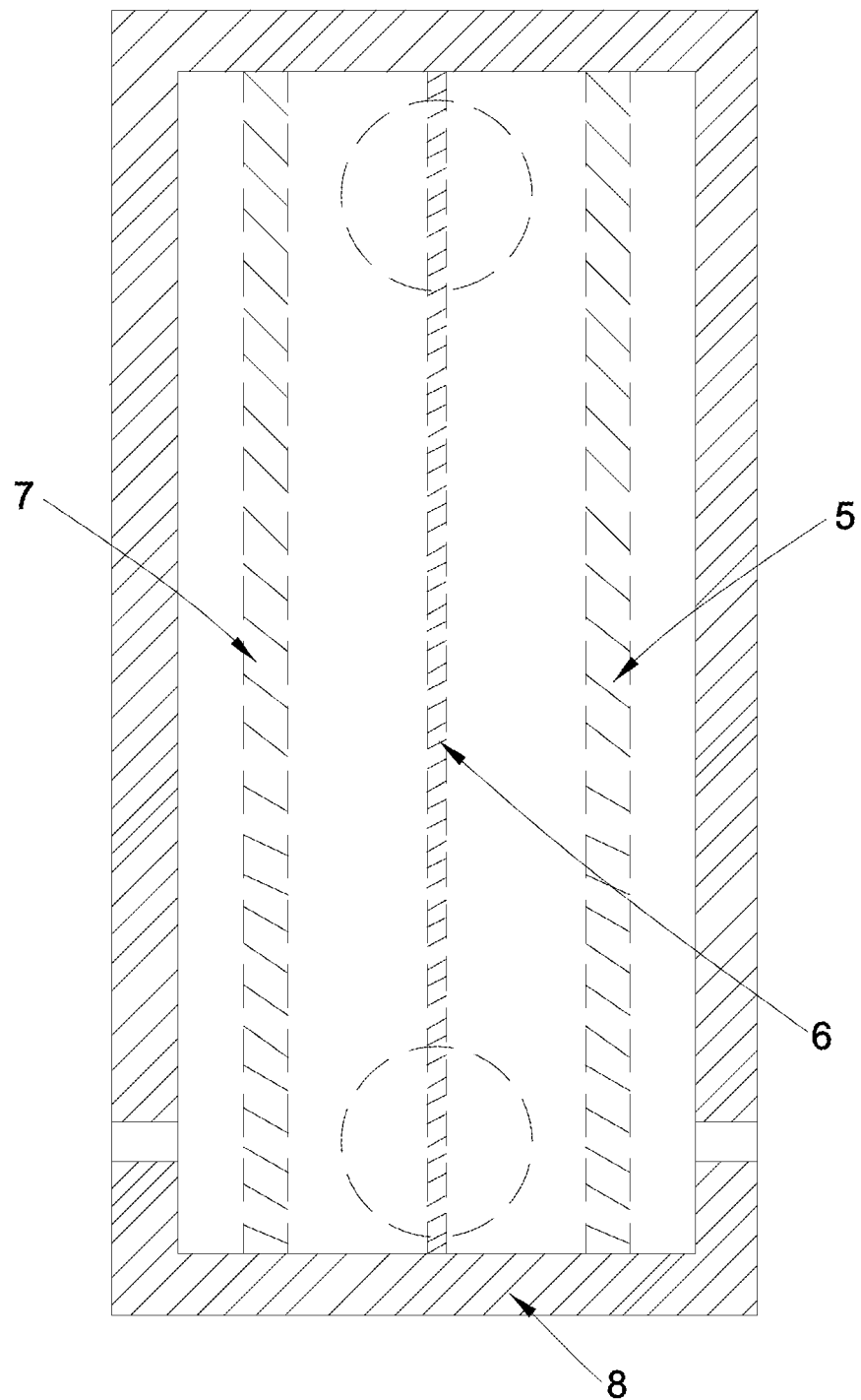
FIG. 14 is a sectional view of the electrocatalytic water equipment shown in FIG. 13.
Figure 15:
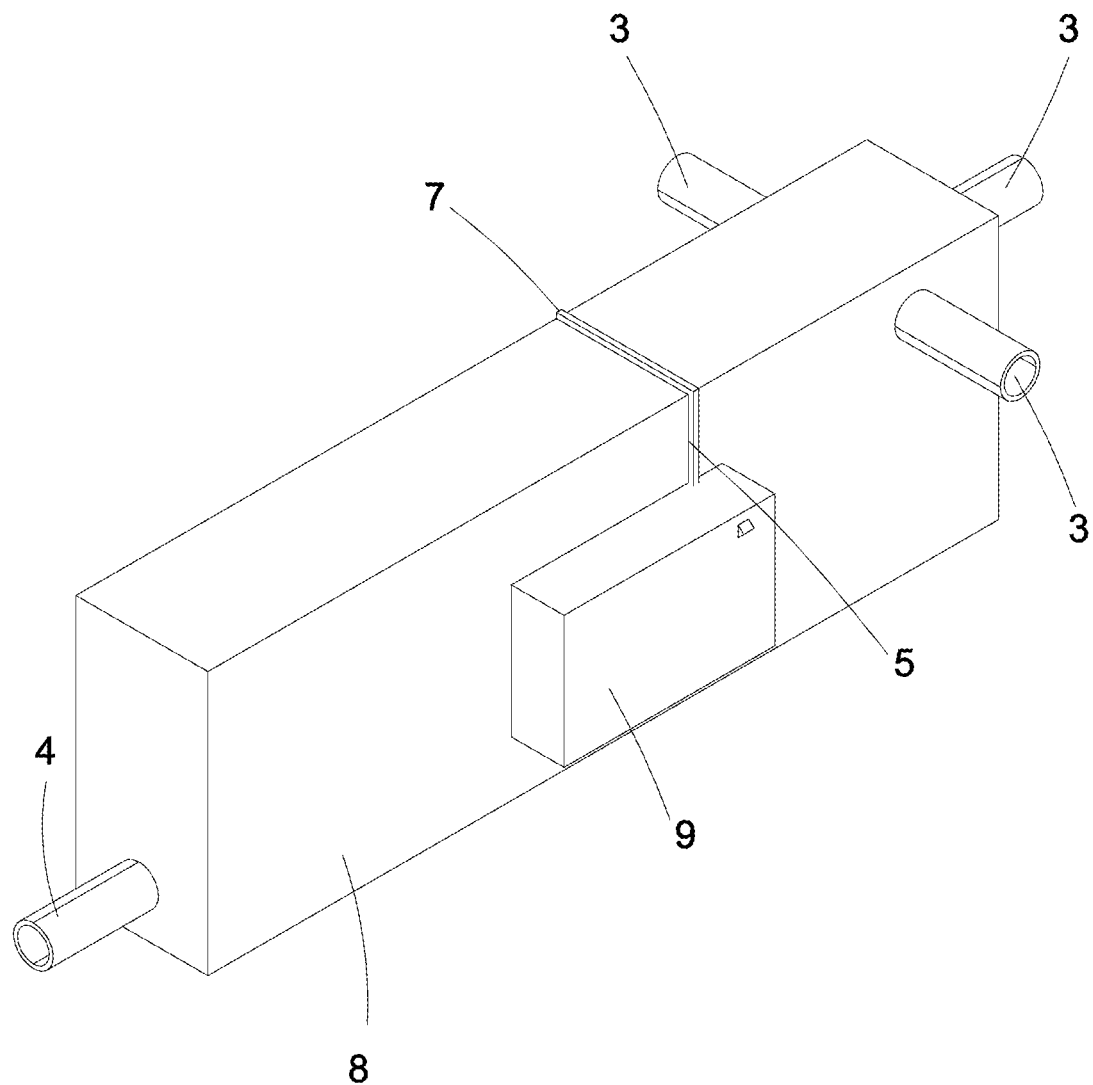
FIG. 15 is an elevational view of a part of the electrocatalytic water equipment shown in FIG. 13, illustrating the arrangement of the electric cabinet at the insulated casing.

The electrocatalytic water equipment is a reactor for continuous generation of water with high redox properties as disclosed in CN 202265444 U. As illustrated in FIGS. 13-15, the electrocatalytic water equipment comprises a positive electrode 7, a negative electrode 5, a cation exchange membrane 6, an insulated casing 8, and an electric cabinet 9. The insulated casing 8 is a rectangular casing made of acid and alkali resistant, high pressure resistant engineering plastics. A water inlet 4 and a plurality of water outlets 3 are disposed at the insulated casing 8 at two opposite sides. The top cover members of the pipelines are detachable but strictly sealed when used. The positive electrode 7 and the negative electrode 5 are disposed at the inner side of the acid and alkali-resistant, high voltage-resistant insulated casing 8 in a length direction. The positive electrode 7 and the negative electrode 5 are respectively spaced from the pipe wall 5 by 5 mm. The gap between the positive electrode 7 and the negative electrode 5 is 50 mm. The positive electrode 7 and the negative electrode 5 are separated by the cation exchange membrane 6. The cation exchange membrane 6 is equally spaced between the positive electrode 7 and the negative electrode 5. In operation, the water outlets 3 are sealed, and then water is injected into the reactor, and then 3000V DC voltage is applied to the positive electrode 7 and the negative electrode 5, and then the water outlets 3 are opened to drain water, keeping the amount of intake water in balance with the amount of water being drained to obtain continuous high redox properties of water.

EXAMPLE IV

The basic oxygen furnace slag treatment method in accordance with Example IV is substantially similar to Example I with the exception that the reaction time is simply 5 hours; the pH value of active aqueous solution A is 2; the mass ratio between basic oxygen furnace slag and active aqueous solution A is 1:10.

Figure 16:
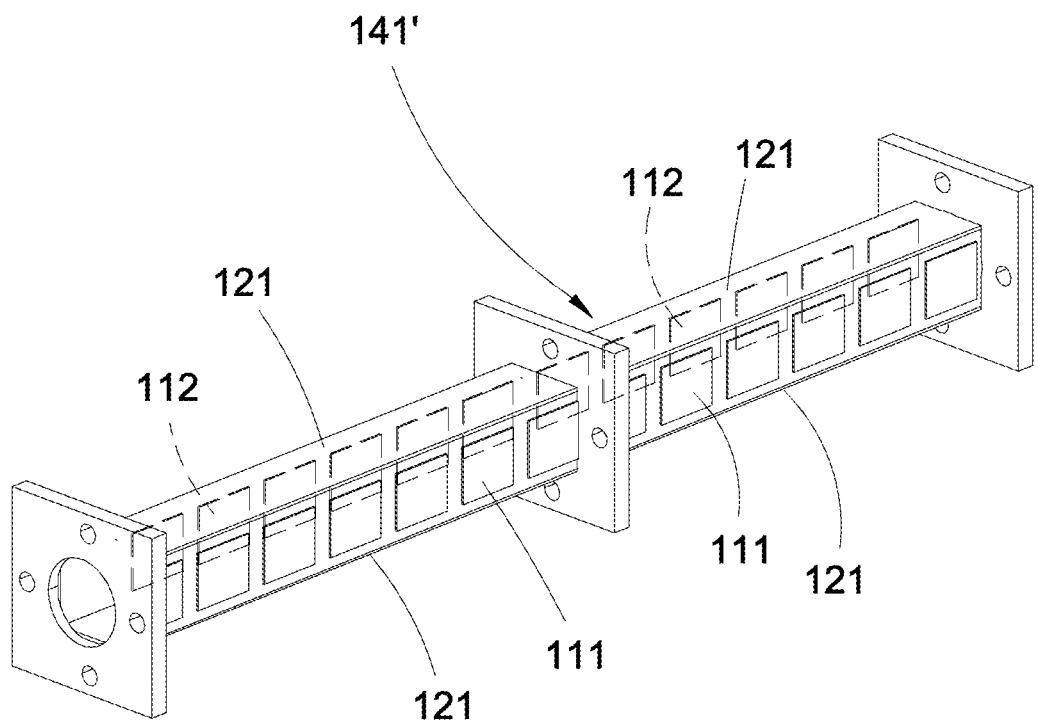
FIG. 16 is a schematic structural view of a part of an electrocatalytic water equipment used in Example IV in accordance with the present invention.
Figure 17:
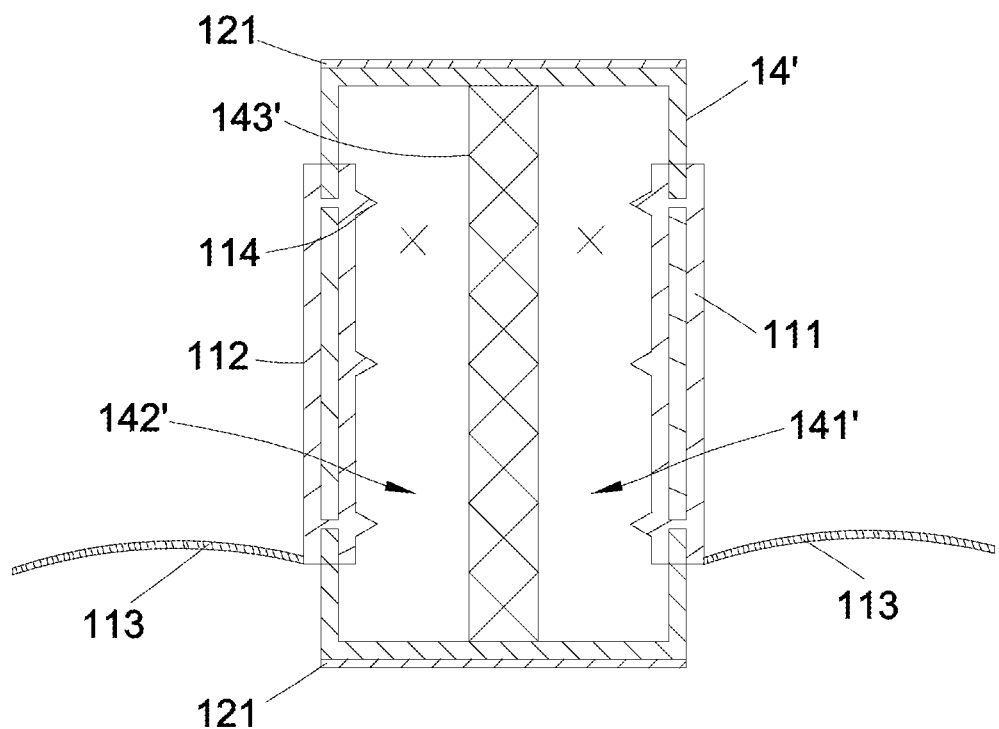
FIG. 17 is a schematic sectional view illustrating the arrangement of the water flow passage in the electrocatalytic water equipment shown in FIG. 16.

The electrocatalytic water equipment is an electromagnetic water treatment device disclosed in CN 104722184 A. As illustrated in FIGS. 16 and 17, the electromagnetic water treatment device 1 comprises a cation exchange membrane 143' a water flow passage 14', at least one positive electrode plate 111, at least one negative electrode plate 112, and a magnetic device. The positive electrode plate 111 and the negative electrode plate 112 are mounted in the water flow passage 14' and electrically conducted to create an electric field in the water flow passage 14' to electrolyze the solution running therethrough. The cation exchange membrane 143' is disposed inside the water flow passage 14' between the positive electrode plate 111 and the negative electrode plate 112 to divide the water flow passage 14' into a first flow conduit 142' and a second water outlet pipe 141'. The magnetic device is mounted on the water flow passage 14' to apply an electric field perpendicular to the direction of the created magnetic field. In this embodiment, the magnetic device comprises a plurality of magnetic plates 121, capable of generating a magnetic field of 6000 gauss. Discharge needles 114 are respectively arranged on the positive electrode plate 111 and the negative electrode plate 112. Further, the positive electrode plate 111 and the negative electrode plate 112 are respectively electrically connected to the positive and negative terminals of the power source 137 by electric wires 113. When tap water is guided into the electromagnetic water treatment device, the positive electrode plate 111 and the negative electrode plate 112 are electrically conducted to start electrolysis. Tap water generally contains sodium chloride, magnesium salts and other minerals. According to the principle of water electrolysis, under the effect of the cation exchange membrane 143', acidic electrolytic water is produced around the positive electrode plate 111 that contains a lot of negative oxygen ions ($O^{2-}$, $O^{3-}$), acting as a strong oxidizing agent, and alkaline electrolytic water is produced around the negative electrode plate 112. Under the presence of a magnetic field perpendicular to the water flow passage 14', water is running in the water flow passage 14', positive and negative ions cut through the magnetic field. Under the effect of Lorentz force, the movement of positive and negative ions toward the positive and negative electrode plates is accelerated. In this embodiment, as illustrated in FIG. 17, the magnetic plates 121 at the upper side of the water flow passage are N-pole magnetic plates, the magnetic plates 121 at the lower side of the water flow passage of S-pole magnetic plates. In the electrolytic process, a large amount of cations move toward the negative electrode plate 112 in the flowing direction of water (water flowing direction is indicated by x in FIG. 17) to cut through the lines of magnetic force. Subject to the effect of Lorentz force to direct toward the negative electrode plate 112, cationic movement is accelerated. Water flowing out of the first flow conduit 142' and water flowing out of the second water outlet pipe 141' are combined to obtain electrolyzed neutral water. Further, electrolyzed acidic water and electrolyzed alkaline water are respectively obtained from the first flow conduit 142' and the second water outlet pipe 141'.

In actual application, the arrangement of the positive and negative electrode plates and the arrangement of the N-pole and S-pole magnetic plates 121 can be adjusted according to actual needs to achieve electrolysis and magnetic field coordination, accelerating movement of ions in water.

Effects of Example I:

It was calculated that the treatment of 1 $m^3$ of basic oxygen furnace slag required 1.2 $m^3$ of electrocatalytic water, 0.3% hydrochloric acid (pH about 1.5) was added with water to reach pH 6.5 i.e., the amount of hydrochloric acid required was 5.32 kg.

The required amount of water is 1.1 tons; the 1 t capacity electrocatalytic water equipment needs to run continuously for 1 hour; the power of the 1 t capacity electrocatalytic water equipment is 7.7 KW; dealing with 1 $m^3$ of basic oxygen furnace slag, the total required power is 7.7 KW.

Using the electrocatalytic water equipment to treat alkaline contamination of basic oxygen furnace slag simply needs a small amount of carbonic acid aqueous solution and a small amount of water and electricity.

The calculation of the economic benefits of the basic oxygen furnace slag treatment method in accordance with Examples II, III and III shows a similar result. In general, the basic oxygen furnace slag treatment method of the invention avoids a secondary pollution and can turn waste into treasure, bringing a number of economic benefits.

In conclusion, the invention provides a basic oxygen furnace slag treatment method, which avoids a secondary pollution and can turn waste into treasure, bringing a number of economic benefits. Further, the implementation of the commercially basic oxygen furnace slag treatment method simply uses commercially available reagents and starting materials, facilitating quick processing and saving the cost.

What the invention claimed is:

1. A basic oxygen furnace slag treatment method, comprising:
   providing an electrocatalytic water equipment;
   preparing an active aqueous solution A having a pH value of 1-2 by mixing hydrochloric acid (HCL) with carbonic acid aqueous solution aqueous solution and passing said mixture of HCL and carbonic acid aqueous solution aqueous solution through said electrocatalytic water equipment;
   mixing basic oxygen furnace slag with said active aqueous solution A to form a mixture;
   maintaining said basic oxygen furnace slag mixed with said active aqueous solution A for reaction for 0.2-5 hours; and
   employing a solid-liquid separation procedure to said basic oxygen furnace slag mixed with said active aqueous solution A and maintained for reaction for 0.2-5 hours to separate solid phase from liquid phase;
   wherein the mass ratio between said basic oxygen furnace slag and said active aqueous solution A is 1:0.5.

* * * * *